April 7, 1942.  S. H. GORDON  2,278,874
CHAIN CABLE
Filed June 18, 1941   2 Sheets-Sheet 1

INVENTOR
S. H. GORDON.
BY
ATTORNEYS

April 7, 1942.  S. H. GORDON  2,278,874
CHAIN CABLE
Filed June 18, 1941  2 Sheets-Sheet 2

INVENTOR
S. H. GORDON.
BY
Blair Kilcoyne
ATTORNEYS

Patented Apr. 7, 1942

2,278,874

UNITED STATES PATENT OFFICE 2,278,874

CHAIN CABLE

Samuel Hunter Gordon, Inverness, Scotland

Application June 18, 1941, Serial No. 398,677
In Great Britain July 23, 1940

10 Claims. (Cl. 59—31)

This invention relates to heavy chain cables of the kind in which the links have transverse studs which act as struts between the two sides of the link to keep them from collapsing inwards when the links are in tension.

The invention is concerned with methods of making the links of such chain cables by uniting together two part-links and the stud in a single operation by means of automatic electric resistance welding, the two part-links meeting together in a plane extending lengthwise of the stud, that is to say, transversely to the length of the link.

In performing such methods it is important that the stud should be placed accurately in position between the ends of the part-links and that there should be no danger of its falling out and of its being knocked sideways out of that position. It is equally important that any provision made for locating the stud in relation to the aforesaid part-link shall not have an adverse effect on the welding operation. The present invention aims at satisfying these requirements.

When the weld line is at or close to the centre line of the stud, the advantage is secured that the heat of the weld secures the stud firmly in place, but difficulties arise which require special provision to overcome them. These difficulties are avoided according to this invention by displacing the weld line lengthwise of the link, so that it is clear, or nearly clear, of the stud, and by locating and locking the stud, at least in one direction, by shaping appropriately the ends of the stud and the parts of the link against which they fit.

According to a further feature of this invention the sides of the link against which the ends of the stud fit are made of substantially uniform cross-section, that is to say they have no upset portions or bulges which are sometimes provided to form flat seating surfaces for the ends of the stud, and the ends of the stud are shaped to correspond, that is to say, they are concave in the transverse direction.

Referring to the accompanying drawings.

Figure 1:
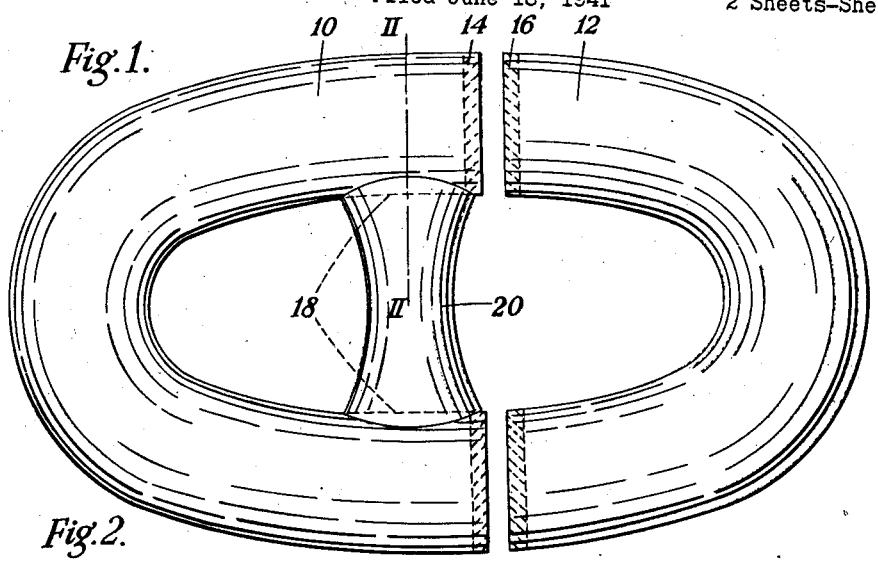
Figure 1 is a side elevation of the three parts of a link according to this invention in the relative positions they occupy prior to the welding operation.
Figure 2:
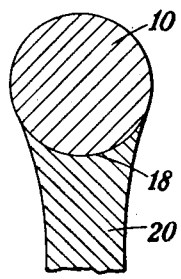
Figure 2 is a cross-section on the line II—II in Figure 1.
Figure 3:
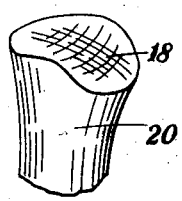
Figure 3 is a perspective view of the stud.

Referring to Figure 1, the two part-links 10, 12 have their meeting ends provided with extra metal 14, 16 which is burned away during the welding. The part 10 of the link is made longer than the part 12 so that the meeting faces of the two parts are just clear of the stud. The cross-section of the part-links is circular throughout and the end faces 18 of the stud 20 are shaped to fit the inner sides of the part-link 10, these faces being convex in the longitudinal direction of the link and concave in the transverse direction. In other words, they are of toric form, as shown in Figure 3.

The half-link 10 is clamped in the fixed head of the welding machine and the stud is placed between its jaws. In order to place the stud in the correct position it must be forced in the endwise direction between the free ends of the part-link which yield elastically to receive it. The stud will then be held in place by the resilience of the part-link. After welding, the force required to separate the sides of the link sufficiently to loosen the stud is many times greater than that required before welding and therefore the stud will be securely held although it does not become welded to the link.

Figure 4:
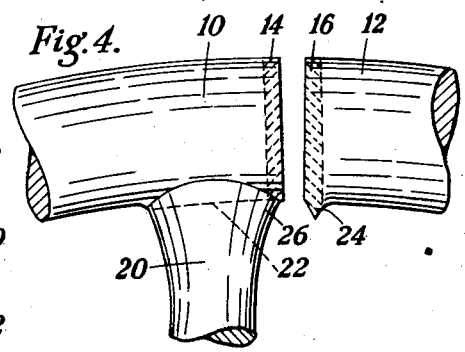
Figures 4 and 5 are views similar to Figure 1 showing modifications.

In the case of very large links the force required to spring the stud into place may be excessive. In such cases the extremities of the part-link 10 are slightly altered in shape as shown in Figure 4, so that the portions 22 between the transverse centre line and the end faces are cylindrical on their inwardly facing sides, the end faces of the stud being shaped to correspond. The stud is wedged into place, without its being necessary to spring the jaws of the part-link apart, but in this case there is nothing to prevent the stud from moving to the right after the link is welded. To avoid this, small projections 24 are provided on the part-link 12 which during the welding operation encounter the corners of the stud at 26 and become united thereto. A part of the projection 24 remains, but this does not interfere with the next link of the chain which is engaged with the loop of the part-link 12.

Figure 5:
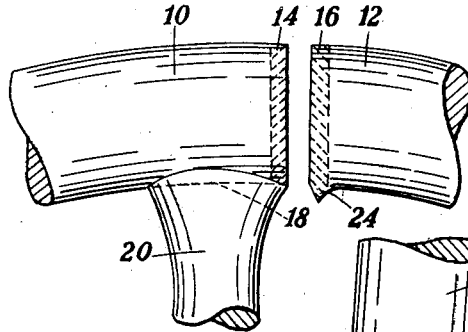
Figure 6:
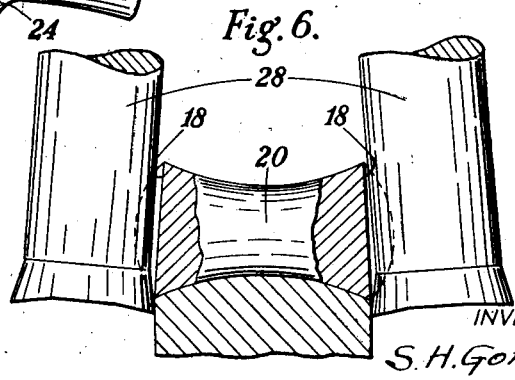
Figure 6 illustrates a device for use in connection with the modification shown in Figure 5.

In Figure 5 a further modification is shown in which the whole of the parts of the surface of the part-link 10 which are engaged by the end faces of the stud are made cylindrical but taper so that the stud is held in position by a wedging action as in the construction of Figure 4. The end faces of the stud may conveniently be cut to the correct shape by the means shown in Figure 6, which shows two cylindrical shear punches 28 constrained to move in slightly divergent paths in guides, not shown. The end faces of the stud are roughly shaped and a finishing cut is made in a press by the two guided punches, thereby imparting to the end faces the required cylindrical shape with the correct angle of taper between them.

In this case also the part-link 12 is formed with projections 24, the purpose of which has already been described.

Figure 7:
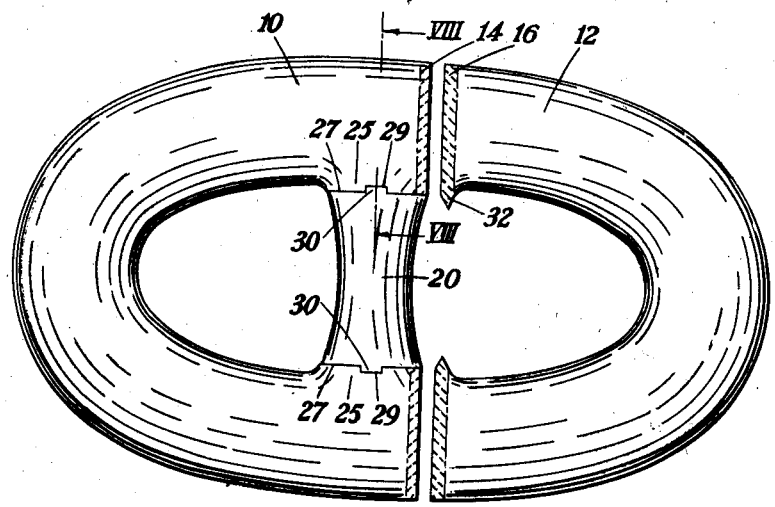
Figure 7 is a view similar to Figure 1 showing a further modification.
Figure 8:
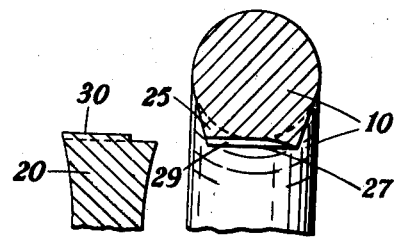
Figure 8 is a cross-section on the line VIII—VIII in Figure 7.

Referring now to Figure 7, the part-link 10 is formed with bulges 25 providing flat seating surfaces 27 for the stud which has flat end faces to correspond. The bulges 25 are formed with shallow transverse grooves 29 which, as shown in Figure 8, do not extend right across the surfaces 27, and these grooves receive projections or keys 30 formed on the flat ends of the stud. These keys likewise do not extend completely across the end faces of the stud.

The part-link 10 is clamped in the fixed welding head of the welding machine in a horizontal position and the stud is retained between the jaws of the part-link by gravity, being unable to fall through because the groove 29 does not extend completely across the surface 27. Evidently the key 30 and the groove 29 will not retain the stud in the finished link because there would be nothing to prevent it from moving sideways in the direction opposite to that by which it was inserted. Hence, the additional metal 14 on the part-link 10 does not extend beyond the side of the stud as it does in the construction shown in Figure 1 and, in addition, small projections 32, similar to the projections 24 (Figures 4 and 5), are formed on the inner corners of the part-link 12. These projections meet the side of the stud near its ends during the flashing period with the result that the corners of the stud are heated to welding temperature. Thus, the stud 20 is welded to the part-link 12 at its corners and thereby held in place.

The grooves 29 and projections 30 may extend lengthwise of the link instead of transversely. In this case also displacement of the stud lengthwise of the grooves and projections is prevented by the welding as described above between the part-link 12 and the stud 20.

I claim:

1. The method of making links of chain cables of the kind hereinbefore referred to consisting in forming two part-links abutting along a line displaced from the minor axis of the link by an amount approximately equal to half the width of the stud, shaping the ends of the stud and the parts of the longer part-link against which they fit so that the stud is located and locked in relation thereto at least in one direction, assembling the stud with the said part-link and uniting the two part-links by automatic electric resistance welding.

2. The method according to claim 1 wherein the ends of the stud are shaped so that the stud can be sprung into place between the jaws of the longer part-link by pressure in the endwise direction of the link.

3. The method according to claim 1 wherein the extremities of the stud and the surfaces of the longer part of the link are so shaped as to locate the stud in one direction only and wherein the weld line is so disposed that the shorter part-link is united by welding to the corners of the stud.

4. The method according to claim 1, wherein the longer part-link is formed with bulges to provide flat seating surfaces, the end faces of the stud being flat to correspond, each seating surface and each end face being formed one with a groove and the other with a projection or key so shaped as to locate the stud securely in relation to the part-link while it is clamped in the welding machine.

5. The method of making links of chain cables of the kind hereinbefore referred to consisting in forming two part-links abutting along a line perpendicular to the major axis of the link, the cross-section of the part-links being substantially uniform throughout without upset portions or bulges for the stud, forming a stud with concave end faces fitting the inner sides of the part-links, assembling the stud with one of the part-links and uniting the two part-links together by automatic electric resistance welding.

6. The method according to claim 5, wherein the part of the link with which the stud is assembled is longer than the other part and the end faces of the stud engage exclusively with the surface of the longer part.

7. The method according to claim 1, wherein the end faces of the stud are of toric shape so that it must be sprung into place between the free ends of the longer part-link which yield elastically to receive it.

8. The method according to claim 1 wherein the inner sides of the longer part-link between the transverse centre line of the finished link and the extremities of the part-link are cylindrical and parallel to one another and the corresponding parts of the end faces of the stud are cylindrically shaped to conform, and the ends of the shorter part-link are provided with projections which encounter the corners of the stud, thereby preventing endwise displacement of the stud after the two parts of the link have been welded together.

9. The method according to claim 1, wherein the inner sides of the longer part-link are cylindrical over the whole extent which is engaged by the end faces of the stud, and are tapered in relation to one another, the end faces of the stud being correspondingly shaped so that the stud can be wedged between the jaws of the said part-link, and wherein small projections are provided on the shorter part-link which encounter the corners of the stud, thereby preventing endwise displacement of the stud after the two parts of the link have been welded together.

10. The method according to claim 1 wherein the end faces of the stud are shaped by means of two cylindrical shear punches, one for each end face, constrained to move in slightly divergent paths by means of guides.

SAMUEL HUNTER GORDON.